United States Patent [19]

Akamatsu et al.

[11] Patent Number: 5,240,725
[45] Date of Patent: Aug. 31, 1993

[54] HEATING POWER CONTROL METHOD AND COOKING APPARATUS

[75] Inventors: Yoshio Akamatsu, Nara; Misugi Yagi, Kyoto; Mitsuo Yokohata, Habikino; Yoshisato Wakashima, Sakurai; Mitsuo Ikeda, Yamatokoriyama, all of Japan

[73] Assignee: Matsushita Electric Industrial Co., Ltd., Osaka, Japan

[21] Appl. No.: 881,635

[22] Filed: May 12, 1992

[30] Foreign Application Priority Data

May 17, 1991 [JP] Japan .................................. 3-113215

[51] Int. Cl.$^5$ ............................. A23L 1/00; F24C 3/00
[52] U.S. Cl. ................................. 426/233; 99/329 R; 99/330; 99/331; 99/344; 426/438; 426/523
[58] Field of Search .............. 426/233, 438, 523; 99/329 R, 330, 331, 344; 236/20 A

[56] References Cited

U.S. PATENT DOCUMENTS

| 3,423,210 | 1/1969 | Martino | 426/233 |
| 4,812,625 | 3/1989 | Ceste | 99/330 |
| 5,090,305 | 2/1992 | Lehman | 99/330 |
| 5,096,116 | 3/1992 | Akamatu et al. | 99/331 |

Primary Examiner—George Yeung
Attorney, Agent, or Firm—Wenderoth, Lind & Ponack

[57] ABSTRACT

A method of cooking material to be fried by heating a cooking vessel and a cooking apparatus, wherein detection is made of a temperature of the cooking vessel and also of a temperature increase characteristic of the cooking vessel with a passage of time subsequent to a start of heating. A characteristic of the cooking vessel such as type of material and wall thickness of the cooking vessel is determined in a low temperature region of the temperature increase characteristic and the quantity of the cooking oil in the cooking vessel is determined in a high temperature region of the temperature increase characteristic. The heating power is controlled according to both a result of determination of the characteristic of the cooking vessel and a result of determination of the quantity of the cooking oil, to thereby accomplish an optimum cooking performance.

8 Claims, 10 Drawing Sheets

HEATING POWER CONTROL METHOD AND COOKING APPARATUS

BACKGROUND OF THE INVENTION

1. Field of the Invention

The present invention relates to a cooking temperature control method and to a cooking apparatus utilizing cooking temperature control.

2. Description of the Prior Art

Figure 13:
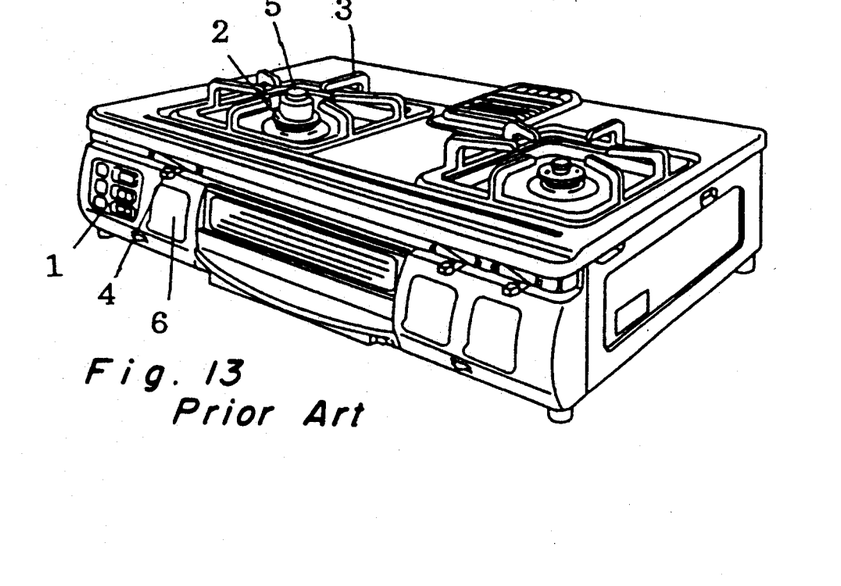
FIG. 13 is a perspective view of the prior art gas range.
Figure 14:
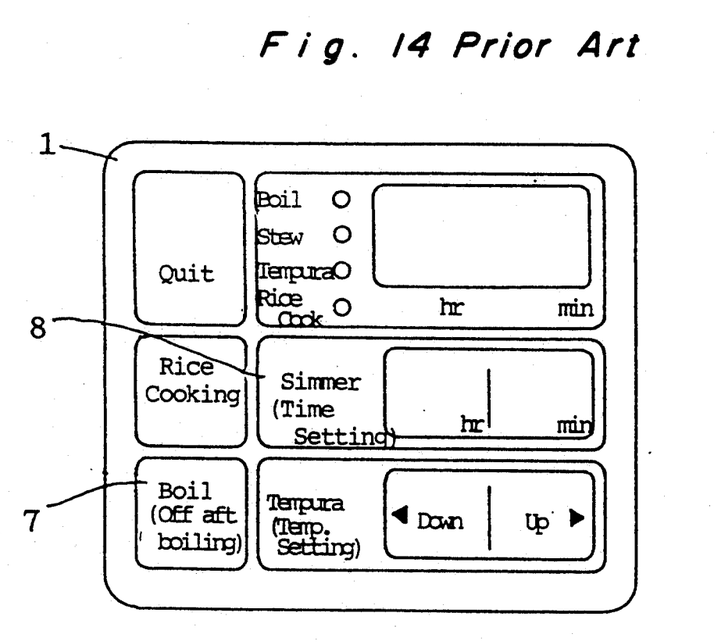
FIG. 14 is a front elevational view, on an enlarged scale, of a control panel used in the prior art gas range shown in FIG. 13.

As an example of a cooking apparatus to which the present invention pertains, a commercially available gas range is shown in FIGS. 13 and 14. FIG. 13 illustrates a perspective view of the conventional gas range and FIG. 14 illustrates, on an enlarged scale, a control panel 1 employed in the conventional gas range shown in FIG. 13 and installed at a front thereof accessible to a user.

As shown in FIGS. 13 and 14, the conventional gas range comprises, in addition to the control panel 1 referred to above, at least one gas burner 2, a heat adjusting knob 4, a temperature sensor 5 for detecting a temperature at a bottom of a cooking vessel, for example, a frying pan, and a fire extinguishing button 6. The control panel 1 includes, as shown in FIG. 14, a "TEMPURA" key 7 that, when operated, sets the gas range in a frying mode in which the temperature of cooking oil is automatically controlled to a target temperature required for a particular cooking; and a "SIMMERING" key 8 that, when operated, sets the gas range in a simmering mode in which an automatic fire extinguishing timer is adapted to be activated upon boiling and, at the same time, the hating power is set to a gentle heating.

When in use, the user has to operate one of the keys, which is appropriate to a one of a cooking items listed in the cooking menu as shown in FIG. 14, before he or she presses an ignition button 6.

According to the prior art gas range, a temperature adjusting scheme (hereinafter referred to as a frying mode) employed therein works with a standard pan, unique to a particular make of gas ranges, in such a manner as to accomplish a temperature control by adequately adjusting the difference between the temperature of the cooking oil, contained in the pan in a predetermined quantity, and the temperature of a pan sensor that measures the temperature in contact with the bottom of the pan. Accordingly, so long as the standard pan is employed which meets requirements set up by a manufacturer of the standard pans, the cooking oil in the standard pan can be heated to a value substantially matcing the preset temperature.

However, a problem has often been encountered with this type of gas range when a non-standard pan is employed. By way of example, assuming that the preset temperature set to the gas range is 180° C., the cooking oil in a iron pan having a 1.2 mm wall thickness (i.e., the standard pan) may be heated to a value about equal to such preset temperature, but the use having an aluminum pan of 4 mm wall thickness may result in a heating of the cooking oil to about 150° C. The use of the non-standard pan does not result in a satisfactory cooking condition.

Thus, with the prior art temperature control scheme, it is not possible to control the temperature of the cooking oil or any other content to a value generally equal to the preset temperature regardless of the thickness of at least the bottom of the pan and/or the type of material used for the pan.

SUMMARY OF THE INVENTION

The present invention has for its essential object to provide a frying cooker utilized for preparing fried food such as, for example, tempura, which is designed to automatically adjust the temperature of cooking oil to a target temperature required for a particular cooking regardless of the wall thickness of and/or the type of material used for the pan.

Another important object of the present invention is to substantially eliminate inconveniences which would, in the case where the temperature of the cooking oil is detected indirectly by a sensor for detecting the temperature at the bottom of a cooking vessel, for example, a frying pan, occur as a result of a substantial difference between the actual temperature of the cooking oil being heated and the temperature at the bottom of the pan which may vary depending on the type of material used for the pan and/or the thickness of at least a bottom of the pan.

In order to accomplish the foregoing objects, the present invention according to one aspect thereof provides a method of controlling the heating of food material to be fried in a cooking oil contained in a cooking vessel with the use of a heating apparatus comprising a heating means for heating the food material accommodated in the cooking vessel, a temperature detecting means for detecting a temperature of the cooking vessel ad a heating control means operable in response to a signal fed from the temperature detecting means to control a heating power generated by the heating means. The heating control method comprises the steps of detecting a temperature increase characteristic of the cooking vessel by means of the temperature detecting means subsequent to a start of heating and also determining, in a first temperature region of the temperature increase characteristic, a characteristic of the cooking vessel such as a type of material and a wall thickness of the cooking vessel; determining the quantity of the cooking oil in the cooking vessel in a second temperature region of the temperature increase characteristic which is higher than said first temperature region; and controlling the heating power of the heating means according to both a determination of the characteristic of the cooking vessel and a result of determination result of the quantity of the cooking oil.

Also, the present invention according to another aspect thereof provides a cooking apparatus which comprises a heating means for heating a cooking vessel containing material to be heated; a temperature detecting means for detecting a temperature of the cooking vessel; a heating control means operable in response to a signal from the temperature detecting means for controlling a heating power generated by the heating means. The temperature detecting means detects a temperature increase characteristic of the cooking vessel as time passes subsequent to a start of heating. Where the material to be heated accommodated in the cooking vessel is a cooking oil, the heating control means is operable to determined, in a first temperature region of the temperature increase characteristic, a characteristic of the cooking vessel such as a type of material and a wall thickness of the cooking vessel, to determined the quantity of the cooking oil in the cooking vessel in a second temperature region of the temperature increase characteristic which is higher than said first temperature region, and to control the heating power of the heating means according to both a determination result of the characteristic of the cooking vessel and a determination result of the quantity of the cooking oil.

In any event, in the practice of the present invention, it is important to infer at least the bottom thickness of the cooking vessel and the type of material used for the cooking vessel from a temperature gradient exhibited by the vessel sensor so that the temperature of the cooking oil in the vessel can be heated to a value generally matching the present temperature.

BRIEF DESCRIPTION OF THE DRAWINGS

This and other objects and features of the present invention will become readily understood from the following description of a preferred embodiment taken with reference to the accompanying drawings, in which.

DETAILED DESCRIPTION OF THE EMBODIMENT

Figure 1:
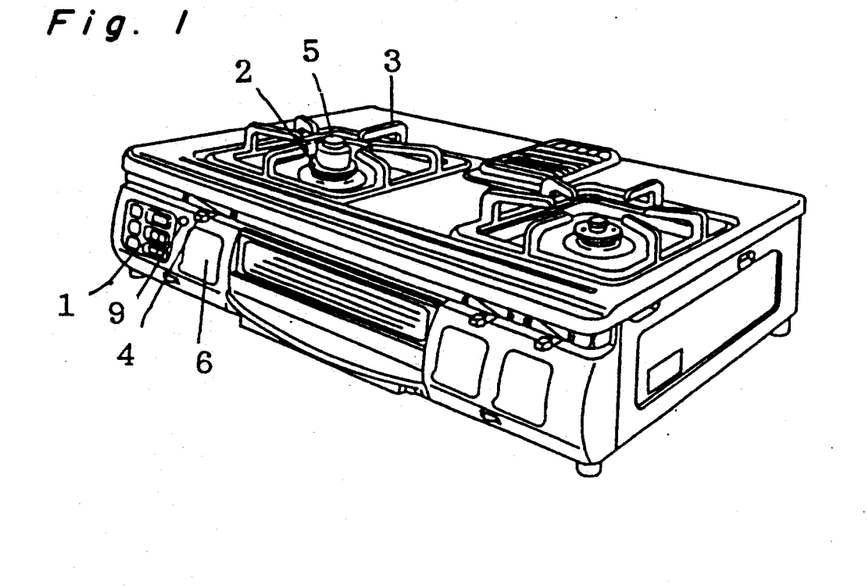
FIG. 1 is a perspective vie of a gas range embodying the present invention.

It is to be noted that in describing a preferred embodiment of the present invention, like parts are designated by like reference numerals throughout the accompanying drawings. FIG. 1 illustrates, in a perspective view, a gas range embodying the present invention, FIG. 2 is a block diagram showing a gas control system, forming a heating means, and an electronic circuit including a microcomputer, and FIGS. 3 to 6 are flowcharts showing respective sequences of operations performed mainly by the microcomputer.

As shown in FIG. 1, unlike the prior art gas range, the gas range embodying the present invention is provided with a warning lamp 9.

Figure 2:
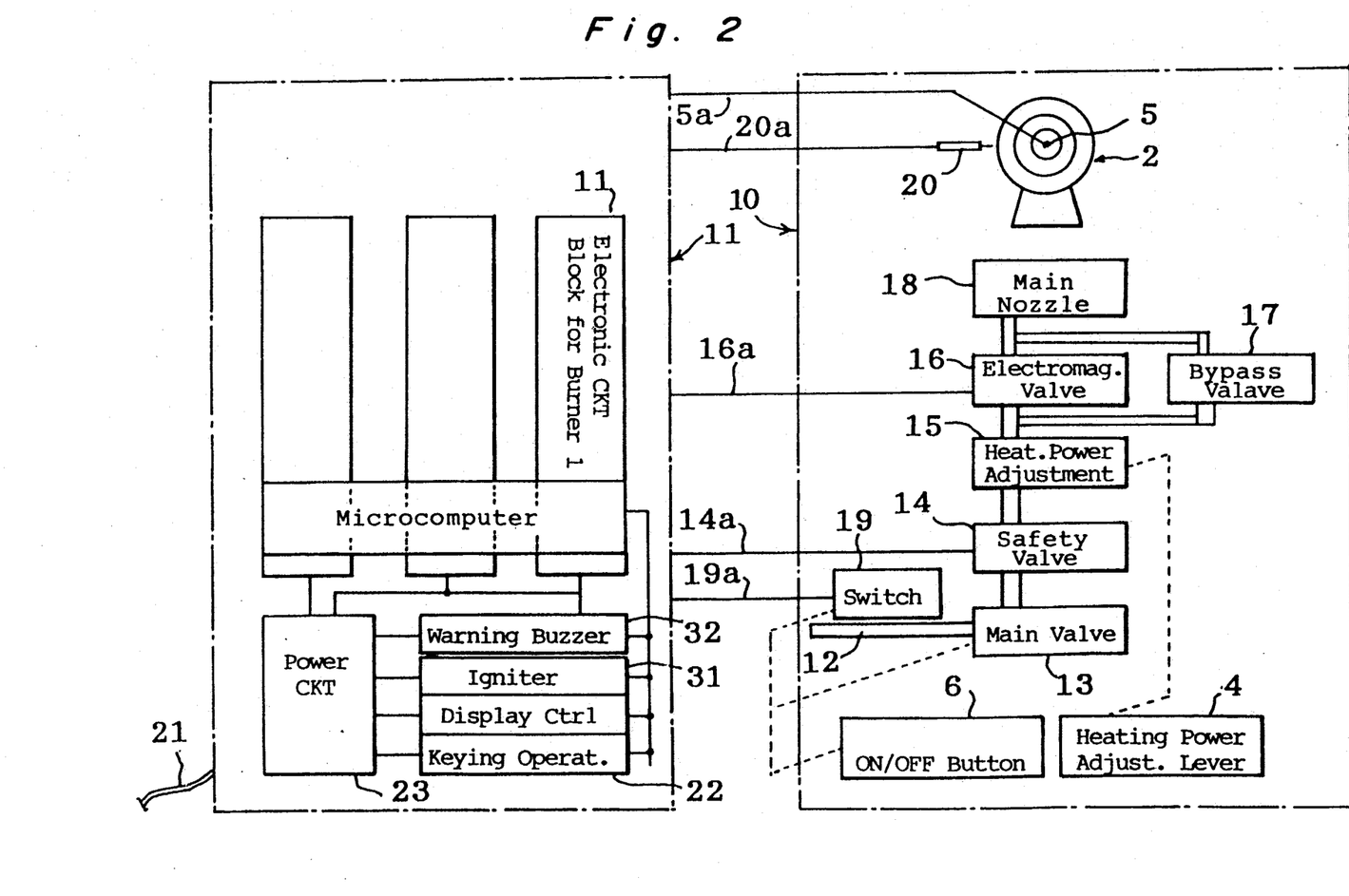
FIG. 2 is a block diagram showing a gas supply circuit and an electronic control circuit employed in the gas range.

FIG. 2 illustrates the structure in a block of one of a plurality of, for example, two, gas burners forming parts of a heating means 10. A shown therein, the heating means 10 is broadly constituted by an electronic circuit block 11.

The heating means 10 includes a gas supply pipe 12; and ON/OFF button 6; a heating power adjustment lever 4; a main valve 13 operatively coupled with the ON/OFF button 6 for selectively opening and closing the gas supply pipe 12; an electronically controlled safety valve 14 for selectively opening and closing the gas supply pipe 12; a lead wire 14a extending from the safety valve 14; a heating power adjustment mechanism 15 for manually adjusting a heating power by a manipulation of the heating power adjusting lever 4; and electronically controlled electromagnetic valve 16 for setting a minimum gas flow; a lead wire 16a leading from the electromagnetic valve 16; a bypass nozzle 17 for setting the minimum gas flow during a closure of the electromagnetic valve 16; a main nozzle 18 for setting a maximum gas flow; a switch 18 operatively associated with the ON/OFF button 6; a lead wire 19a leading from the switch 19; a gas burner 2; a vessel temperature sensor 5; an ignition electrode 20; and a lead wire 20a leading from the ignition electrode 20.

An electronic circuit block 11 includes a 100-volt AC power supply line 21 connected to a power circuit 23 for the supply of an electric power thereto and also includes a menu select key 22, an igniter 31, a warning buzzer 32 and the warning lamp 9.

In the above described construction, when the power circuit 23 is connected with a source of the electric power through the power supply lien 21 and the ON/OFF button 6 is operated, the burner switch 19 operatively associated with the ON/OFF button 6 is turned on to supply the electric power to the safety valve and the electromagnetic valve 16, which are controlled by a heating control means 24, to open the safety valve 14 and the electromagnetic valve 16. Gas in the heating means 24 is then supplied to the heating power adjustment mechanism 15 through the gas supply pipe 12 by way of the main valve 13 and the safety valve 14, then to the main nozzle 18 in part through the electromagnetic valve 16 and in part through the bypass nozzle 17 an finally to the burner 2. At the same time, the gas emerging from the burner 2 is ignited by sparks generated from the ignition electrode 20 to which a high voltage is applied from the igniter 30 which operates for a limited time subsequent to the burner switch 19 having been turned on. Combustion of the gas so ignited in the manner described above takes place.

At an initial stage of the ignition of the gas, food material to be cooked shows a temperature generally equal to room temperature and, accordingly, the vessel temperature sensor 5 reads a value generally equal to room temperature. In this condition, both of the safety valve 14 and the electromagnetic valve 16 are held in an open position, and the heat value or heating power can be adjusted by the user by manipulating the heating power adjusting lever 4 to control the heating power adjustment mechanism 15. It is to be noted that the heating power adjustment mechanism 15 is held in a position to attain the minimum available heating power, the electromagnetic valve 16 is in a closed position while the minimum gas flow through the bypass nozzle 17 is utilized to accomplish the combustion at the minimum available heating power. Thus, it will readily be seen that, even without the electromagnetic valve 16, a setting of the heating power adjusting lever 4 to a minimum power position may serve an alternative to the electromagnetic valve 14. The burning gas can be extinguished either when the ON/OFF button 6 is subsequently manipulated or when the supply of the electric power to the safety valve 14 is interrupted.

As a matter of course, a continued combustion of the gas results in an increase of the temperature of the food material to be cooked, accompanied by a corresponding change in resistance of the vessel temperature sensor 5 which employs a thermistor as a temperature measuring element. The change in resistance of the vessel temperature sensor 5 is inputted to the electronic circuit block 11 through the lead wire 5a. Within the electronic circuit block 11, there is provided a temperature detecting means 25 operable to add or subtract a predetermined coefficient to or from the resistance value of the vessel temperature sensor 5, which varies with change in temperature, and then to convert it into a temperature.

Figure 3:
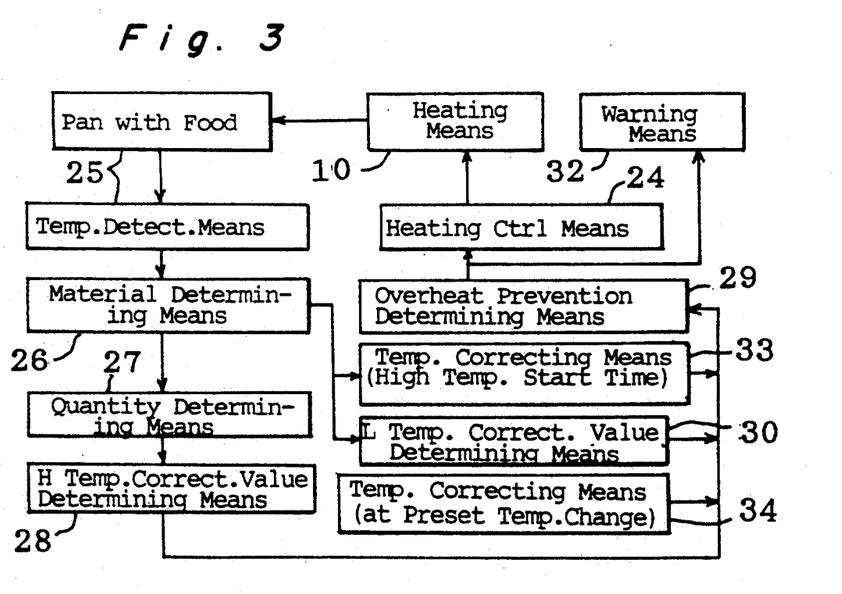
FIGS. 3 to 8 illustrate respective structures of various determining means employed in the gas range.

FIG. 3 illustrates a basic structure of various determining means operating during the tempura (frying) mode that is initiated when the TEMPURA key shown in FIG. 14 has been pressed. As shown therein, the extent to which a pan containing food material is heated by the heat generated by a heating means controlled by the heating control means 24 is detected by the temperature detecting means 25. Both of the shape of the pan and the type of material for the pan are determined by a material determining means 25. Depending on a result of determination by the material determining means 25, a temperature correction value id determined through a quantity determining means 26 and an H temperature correction value determining means 28 or through a L temperature correction value determining means 30 so that a control temperature necessary to control the temperature of the cooking oil within the pan to a preset value can be determined, which temperature correction value is outputted to the heating control means 24 to cause the latter to drive the heating means 10. Also, since there may be a possibility that the type of material for the pan used cannot be determined because of a high temperature detected by the temperature detecting means 24 at an initial time, a high temperature start temperature correcting means 33 is provided, and a preset change time temperature correcting means 34 is also provided, as a countermeasure to meet with a situation in which a preset temperature is changed during the use, to accomplish a temperature correction at the time of change of the preset temperature during the use. While during a temperature control (i.e., during a cooking taking place) the temperature control wherein the heating means 10 is set to a low fire or a high fire is carried out in reference to the value of the previously mentioned control temperature and the temperature detected by the temperature detecting means 25, an overheating prevention determining means 29 is operated, in the event that the temperature detected by the temperature detecting means 25 during the low fire heating attains an overheating suppression temperature $\beta$, so that, when an overheating prevention temperature is attained, a control signal can be supplied from the overheating prevention determining means 29 to both of the heating control means 24 and a warning means 32.

Figure 4:
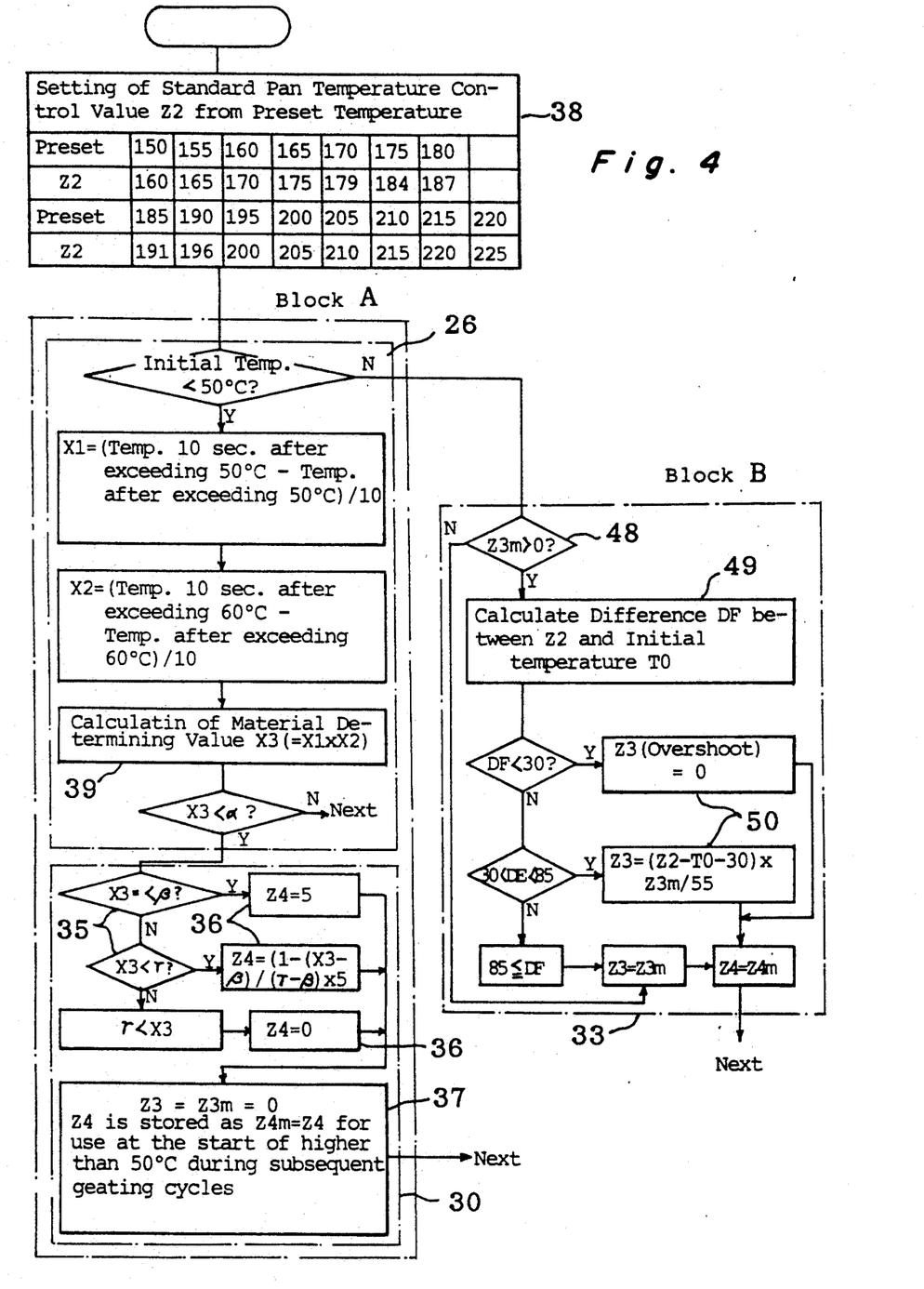

Referring now to FIG. 4, Block A shown therein illustrates contents of the material determining means 26 and the L temperature correction value determining means 30. With reference to Block A, after a preset temperature appropriate to a particular cooking purpose has been keyed in by manipulating keys 7a and 7b (shown in FIG. 14), a standard pan control temperature Z2 relative to the preset temperature is determined at block 38. Thereafter, the material determining means 26 is operated only when an initial value of the detected temperature (i.e., the temperature detected by the temperature detecting means 25) is lower than 50° C., and the detected temperature is inputted to the material determining means 26 at intervals of a predetermined time so that, when the detected temperature attains 50° C. and 60° C., material variables X1 and 2 are sequentially calculated by dividing the difference between the temperatures detected a predetermined time after the detected temperatures have exceeded 50° C. and 60° C. and the temperatures detected at the time the detected temperatures have attained 50° C. an 60° C., by the predetermined time. After the sequential calculation of the material variables X1 and X2, both variables are multiplied together to provide a material determined value X3 which is subsequently compared with a determining value $\alpha$. When the material determined value X3 is found to be smaller than the determining value $\alpha$, the L temperature correction value determining means 30 performs a rank classification at successive blocks 36 according to the magnitude of the material determined value X3 determined at block 39 and determines a L correction value Z4 at block 36 for each rank, which is subsequently stored in a correction value storage 37 as an L correction value Z4m while outputting a signal to the heating control means 24.

Block B shown in FIG. 4 illustrates contents of the high temperature start correction means 33. With reference to Block B, after the preset temperature appropriate to a particular cooking purpose has been keyed in by manipulating keys 7a and 7b (shown in FIG. 14), the standard pan control temperature Z2 relative to the preset temperature is determined at block 38. Thereafter, the high temperature start correction means 33 is operated only when an initial value of the detected temperature (i.e., the temperature detected by the temperature detecting means 25) is higher than 50° C. Consequent upon operation of the high temperature start correction means 33 and when a condition establishes that the H correction value Z3m stored during the previous use cycle is greater than zero, the temperature difference DF between the standard pan control temperature Z2 and the initial value of the detected temperature is determined at block 49, the magnitude of said temperature difference DF being classified into ranks so that the H correction value Z3 appropriate to a particular rank can be determined at one of blocks 50. Where the condition that the H correction value Z3m stored during the previous use cycle is greater than zero is not established, the L correction value Z4m stored during the previous use cycle is used as an L correction value Z4.

Figure 5:
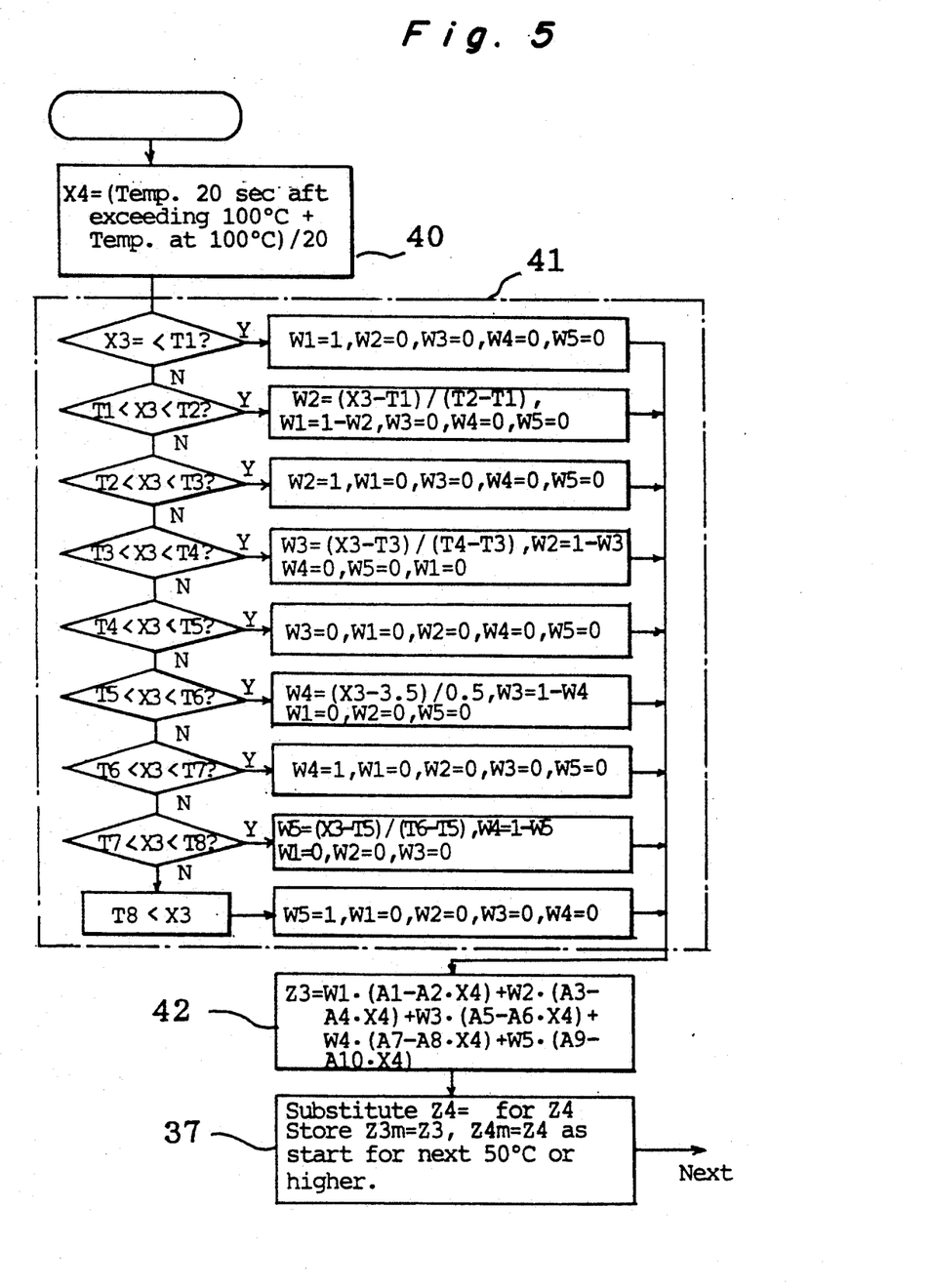

FIG. 5 illustrates contents of the quantity determining means 27 and the H temperature correction value determining means 28. In the event that the condition that the determining value $\alpha$ is greater than the material determined value X3 is not established as determined by the quantity determining means 27, the quantity determining means 27 reads the detected temperature of the temperature detecting means into the material determining means 26 at intervals of a predetermined time; when the detected temperature attains 100° C., calculates a quantity determining variable X4 at block 40 by dividing the difference between the temperature detected a predetermined time after the detected temperature has exceeded 100° C. and the temperature detected at the time the detected temperature has attained 100° C., by the predetermined time; determine the H correction value Z3 at block 42 in reference to an interrelationship between variables W1 to S5 determined at block 40 for each of ranks of the material determined value X3 determined at block 39 and the quantity determining variable X4 determined at block 40; and substitutes a predetermined value δ for the L correction value Z4; stores in a correction value storage 37 as a stored H correction value Z3m and a stored L correction value Z4m while outputting a signal to the heating control means 24.

Figure 6:
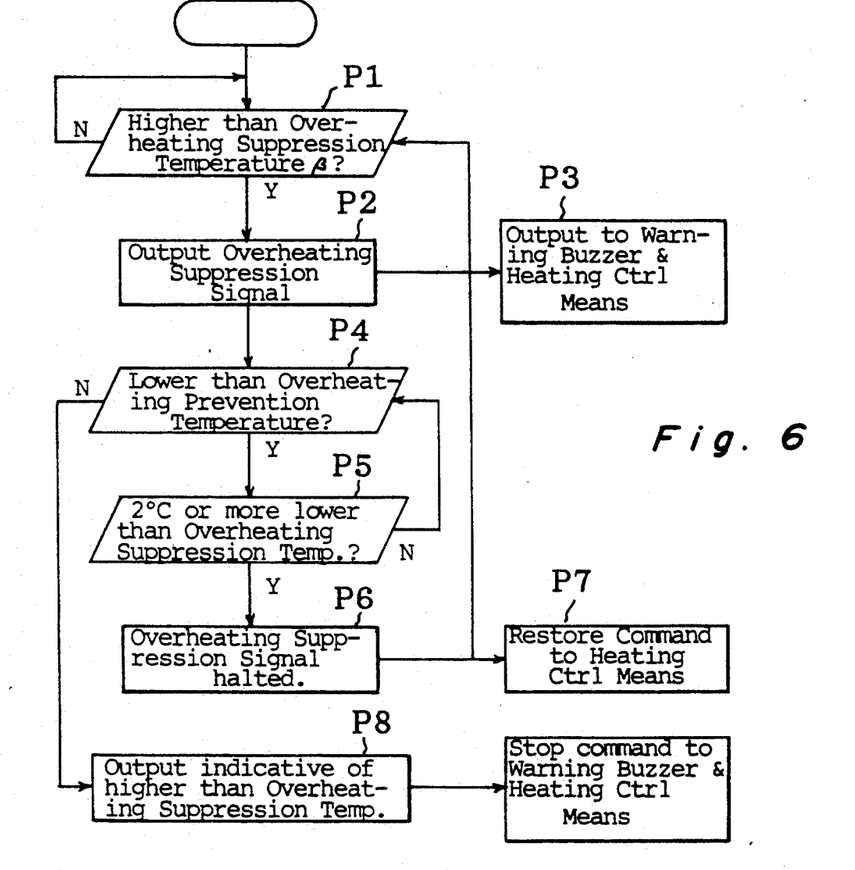

FIG. 6 illustrates the overheating control means 29. At block P1, a decision is made to determine if the detected temperature is higher than the overheating suppression temperature $\beta$ and, if it is higher than the overheating suppression temperature $\beta$, an overheating suppression signal is outputted at block P2 to a next step and, at the same time, a heating power reducing command is generated to the warning buzzer 32 and the heating control means 24 at block P3. Subsequent to an increase of the detected temperature over the overheating suppression temperature, a decision is made at block P4 to determine if the detected temperature so increased is lower than the overheating prevention temperature $\beta$ and, if it is lower than the overheating prevention temperature, another decision is made at block P5 to determine if the detected temperature is lower than the overheating suppression temperature less a predetermined temperature, for example, 2C. If a result of determination at block P5 indicates that the detected temperature is lower than the overheating suppression temperature less the predetermined value, the outputting of the overheating suppression signal is interrupted at block P6, followed by a generation of a heating power restoration command to the heating control means 24 at block P7 and, at the same time, connecting to block P1.

On the other hand, should a result of decision at block P4 indicate that the detected temperature is not lower than the overheating prevention temperature, that is, the detected temperature is higher than the overheating prevention temperature $\beta$, a signal indicative of the detected temperature being higher than the overheating prevention temperature $\beta$ is outputted at block P8 to energize the warning buzzer 32 and, at the same time, to command the heating control means 24 to interrupt the heating.

Figure 7:
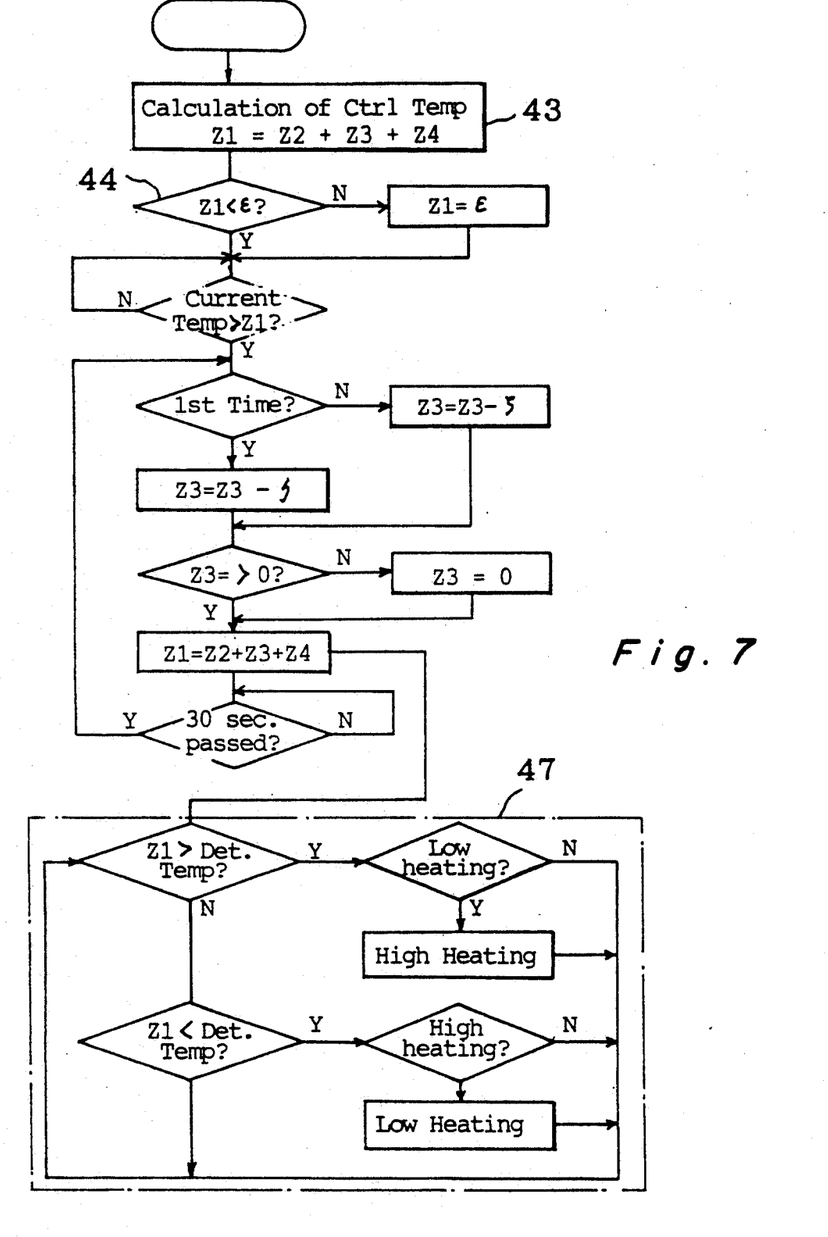

FIG. 7 illustrates contents of the heating control means 24. At block 43, the control temperature Z1 is determined by adding the H and L correction values Z3 and Z4, outputted from the H and L temperature correction value determining means 28 and 30, respectively, and the standard pan control temperature Z2 for the preset temperature together, that is, $Z1 = Z2 + Z3 + Z4$, followed by block 44 at which the control temperature Z1 is set to be unable to exceed the overheating prevention temperature $\epsilon$, while allowing the heating means 10 to heat until the detected temperature attains a value equal to the control temperature Z1. When the detected temperature attains a value equal to the control temperature Z1 for the first time, a predetermined value $\eta$ is subtracted from the H correction value Z3 and, subsequently, every 30 seconds a predetermined value $\zeta$ is subtracted from the H correction value Z3 repeatedly until the H correction value Z3 becomes zero. A temperature control unit 47 monitors both of the control temperature Z1 and the status of the detected temperature and outputs to the heating unit 10 one of a low heating command when the control temperature Z1 is lower than the detected temperature and a high heating command when the control temperature Z1 is higher than the detected temperature.

Figure 8:
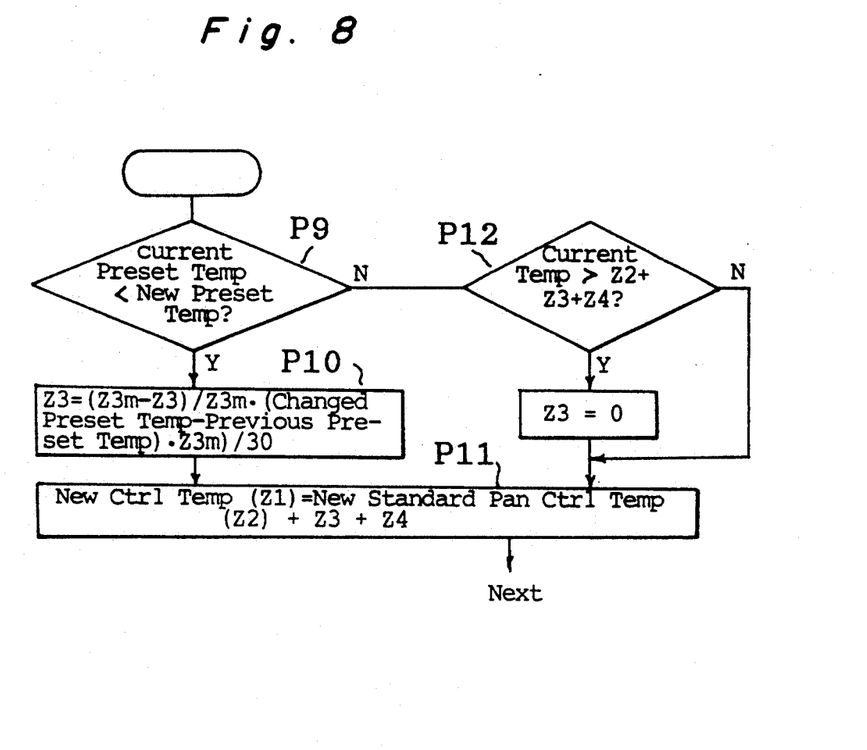

FIG. 8 illustrates the preset change time temperature correcting means 34. With reference to FIG. 8, at block P9 a decision is made to determine if a new preset temperature is lower than the current preset temperature and, if the new preset temperature is higher than the current preset temperature, a new H correction value Z3 is determined at block P10 in reference to a relationship between the stored H corrected temperature, the current H corrected temperature and the difference between the respective temperatures before and after the change of the preset temperature so that a new control temperature Z1 can subsequently be determined at block P11. On the other hand, if a result of decision at block P9 indicates that the new preset temperature is not higher than the current preset temperature, another decision is made at block P12 to determine whether or not the previously preset temperature is lower than the detected temperature and, if the conditions is established, the H corrected temperatue Z3 is rendered to be zero,1 but if the condition is not established, the H corrected temperature Z3 remains unchanged, followed by block P11 at which the new control temperature Z1 is determined. Thereafter, the flow proceeds to the next succeeding step.

With the construction shown in FIG. 3, while according to the prior art the temperature of the cooking oil heated does not coincide with the preset temperature unless the standard pan is employed, the present invention makes it possible to make the temperature of the cooking oil attain a value substantially equal to the preset temperature regardless of the thickness of the material for the pan, even at the high temperature start at which time the type of material for the pan cannot be determined, and/or even when the preset temperature is changed during the course of heating.

Figure 9:
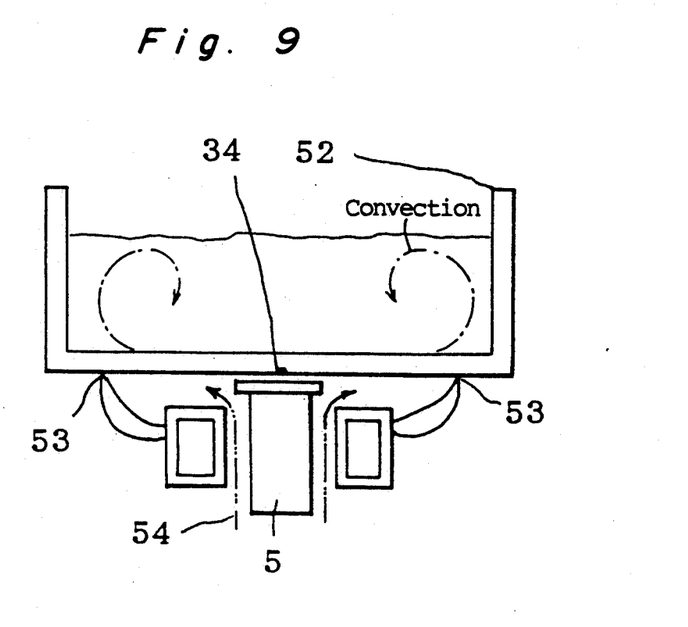
FIG. 9 is a schematic diagram showing a gas burner and a pan placed thereon.

To determine the standard pan control temperature 38 from the preset temperature as shown in FIG. 4 and also to describe the material determining means 26, the pan 52 accommodating food material to be cooked by the heating means 10 is, as shown in FIG. 9, heated by flames emanating from the burner 2 touching heating points 53 at the bottom of the pan 52, with heat consequently transmitted to the whole of the pan 52. Simultaneously with the conduction of heat to the pan 52, the heat is transmitted to the food material within the pan 52 with convection taking place within the pan 52. As a result of the convection taking place within the pan 52, the pan 52 with the food material therein can be uniformly heated, accompanied by an increase in temperature of the vessel temperature sensor 5. The vessel temperature sensor 5 for the measurement of the temperature at the bottom of the pan 52, which is disposed at a position aligned with the center of the bottom of the pan 52, essentially detects the previously described two conditions of heat. (However, it is pointed out that, in order to lessen the thermal influence which may be brought on the vessel temperature sensor 5, the vessel temperature sensor 5 is cooled by a secondary air for cooling as indicated by 54.) In this condition, where the pan 52 is made of material having a high thermal conductivity such as aluminum, the temperature of the vessel temperature sensor 5 due to a thermal conduction at the bottom of the pan 52 regardless of the temperature of the cooking oil within the pan 52. However, where the pan 52 is in the form of, for example, an enameled pan having a low thermal conductivity, the temperature of the vessel temperature sensor 5 increases with increase of the temperature of the cooking oil. Also, since the convection does not occur vigorously in the cooking oil unless the temperature of the cooking oil attains a value higher than 100° C., the foregoing tendency occurs considerably before the vigorous convection takes place within the pan 52.

Figure 10:
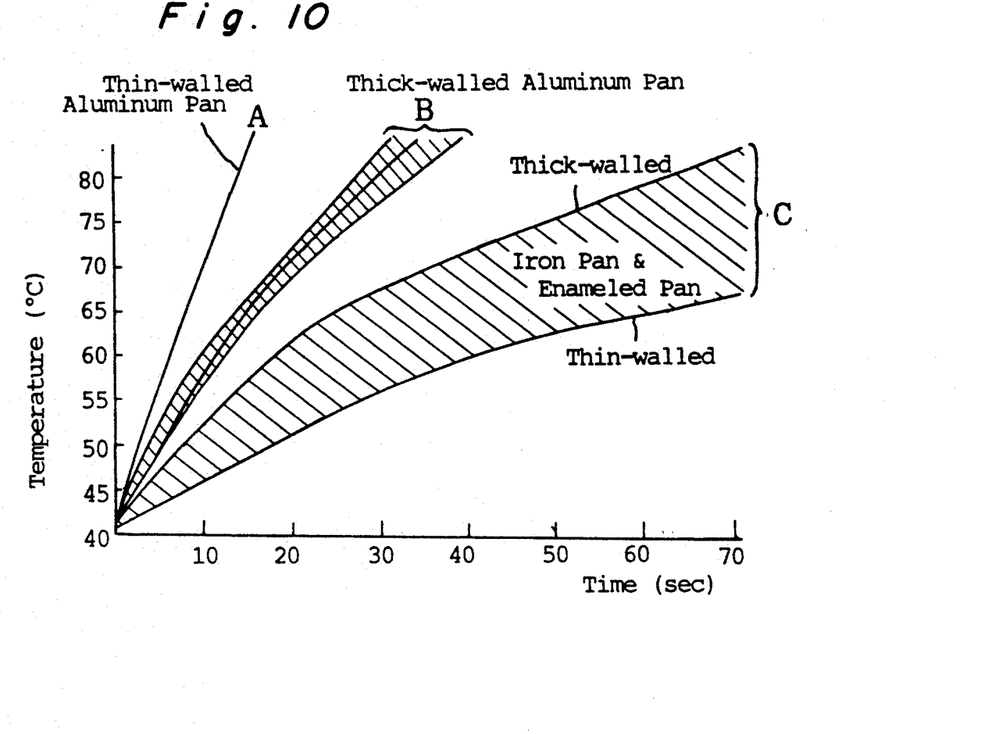
FIG. 10 is a graph showing a change in temperature at the pan bottom with time of various pans of different materials and different thickness.

Referring to FIG. 10, the above described tendency as actually measured is shown. AS shown therein, subsequent to the start of heating, the rate of increase of the temperature is highest in the case of a thin-walled aluminum pan shown by A and lowest in the case of the thick-walled iron pan shown by C with the thick-walled aluminum pan exhibiting a value generally intermediately therebetween as shown by B.

Figure 11:
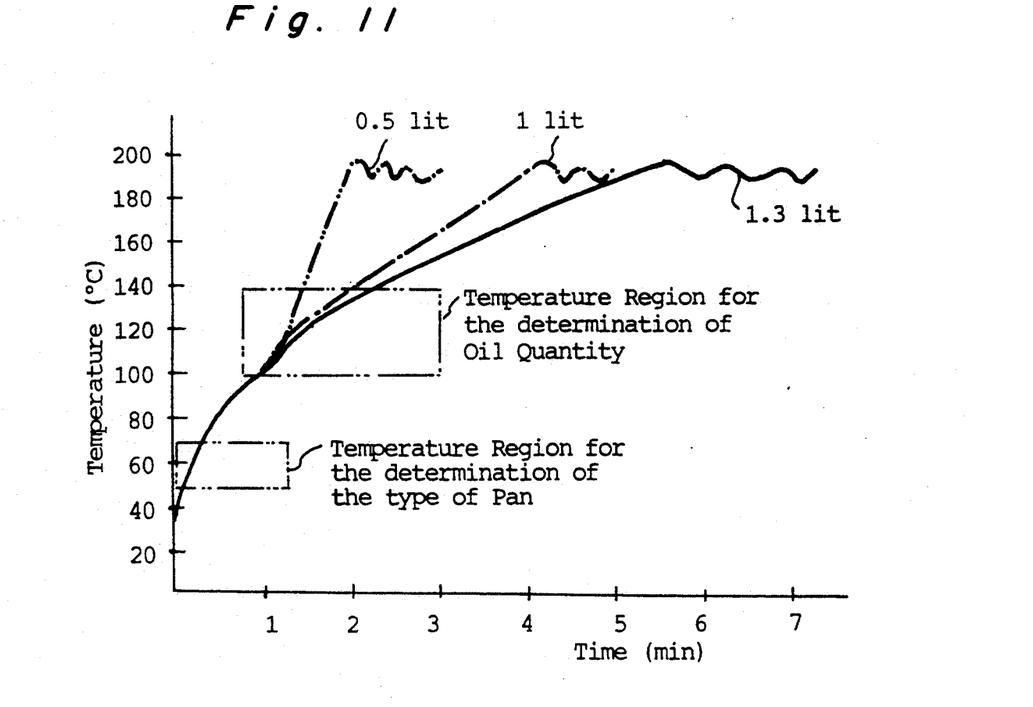
FIG. 11 is a graph showing a relationship between the quantity of cooking oil and the temperature at the bottom of the pan.

FIG. 11 illustrates how the increase in temperature of the vessel temperature sensor 5 increases with a change in quantity of the cooking oil within an aluminum pan having a wall thickness of 4 mm. FIG. 11 makes it clear that, since the convection takes place vigorously within the pan when the cooking oil is heated to a temperature exceeding 100° C., the rate of increase of the sensor temperature varies with a change in quantity of the cooking oil.

Figure 12:
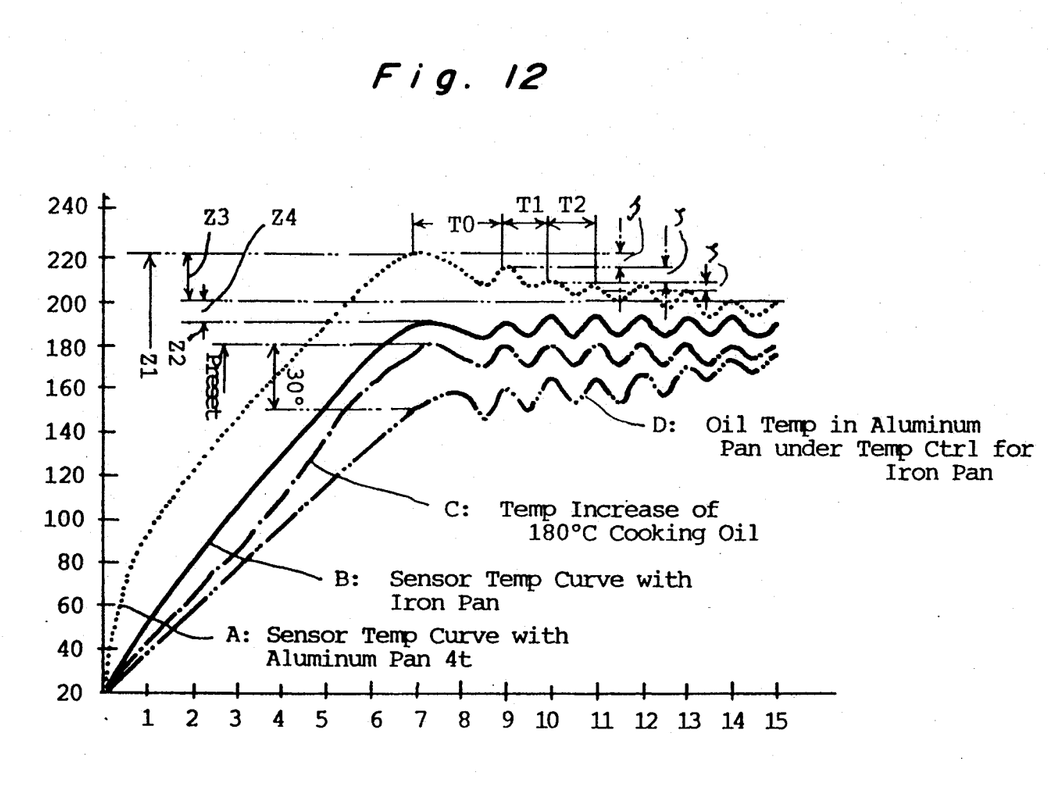
FIG. 12 is a graph showing an interrelationship between the temperature of the cooking coil and the temperature at the bottom of the pan detected by the vessel sensor.

Whether the thermal conductivity is high or whether the thermal conductivity is low may vary even then the sensor temperature exhibits a high temperature. Referring to FIG. 12, it will readily be seen that there is a difference in temperature between a temperature curve T2 exhibited by the vessel temperature sensor 5 measuring the bottom temperature of an iron pan with the cooking oil heated to 180° C. and a temperature curve T3 exhibited by the vessel temperature sensor 5 when the cooking oil within the same iron pan is heated to 180° C. This represents the standard pan temperature control value Z2 and means that, since the temperature of the vessel temperature sensor 5 is always higher than the temperature of the cooking oil, the preset temperature is required to be added with a correction value.

While the material determining means 26 determines, as discussed with reference to FIG 10, the material determined value X3 in reference to the "rate of increase of the temperature at the bottom of the pan when each type of pan is at a low temperature of each pan", the smaller the material determined value X3 is, the lower the thermal conductivity the material (ferrous type) has. For a given ferrous material, the thermal conductivity becomes high with an increase in wall thickness and, therefore, any correction is needed. For this purpose, depending on the value of the material determined value X3, the correction is carried out to calculate the L corrected value Z4. Consequent thereupon, by determining the type of material for and the wall thickness of the pan, the difference between the preset temperature, which may vary depending on the type of pan, and the temperature of the cooking oil is automatically eliminated. The purpose of storage of the L correction value Z4 as the stored L correction value Z4m is that, in view of the fact that in most households a particular pan once used for frying purpose or designed for use in frying is generally limited for use in frying, the previous condition of use in which the pan was used for frying is stored in the storage unit 37 and, at the time of high temperature start, the condition of the pan is also stored because the type of material for the pan cannot be determined at a high temperature of the cooking oil, so that the high temperature start temperature correcting means 33 shown in Block B in FIG. 4 can be used.

Although with reference to FIG. 12 the quantity determining means 26 and the H temperature correction determining means 28 for calculating the corrected temperature for the pan having a high thermal conductivity such as an aluminum pan have been described, results of experiments have indicated that, as shown in FIG. 12, when a control is made with the control temperature Z1 for the iron pan as shown by T2, the cooking oil when heated exhibits a temperature curve as shown by T4. In other words, when the vessel temperature sensor 5 attains a value equal to the preset temperature, the temperature of the cooking oil is about 150° C. This temperature increases progressively with a subsequent passage of time and, although not shown, reaches a value about equal to the preset temperature in about 30 minutes.

From the foregoing, it is obvious that, where the pan having a high thermal conductivity such as an aluminum pan is used, the control temperature Z1 has to be composed of the correction value (the H correction value Z3m) for equalizing the oil temperature by progressively subtracting the correction value from the initially corrected value, and the correction value (the L correction value Z3) superimposed on the preset temperature and having no change with time. Since, if the correction value Z3 remains the same for any quantity, the oil temperature tends to be excessively high when the oil quantity is small and this is generally contrary to actual circumstances, the H correction value Z3 is corrected in reference to the correlation between the quantity determining variable X4, determined by the quantity determining means 40, and the material determined value, and, after the predetermined value δ has been substituted for the L correction value Z4, various correction values are stored in the storage unit 37 in a manner similar to the foregoing. With the foregoing construction, it is possible to render the preset temperature to be equal to the oil temperature even when the pan having a high thermal conductivity is employed.

although the overheating preventing means 29 has been described with reference to FIG. 6, this overheating preventing means is effective to avoid an occurrence of oil fire which would occur when the condition in which the pan used is very small while the minimum heat calorie of the heating unit 10 is very high (for example, the condition in which a small quantity of cooking oil is applied to a frying pan) is allowed to stand for a substantial length of time. Therefore, the use of the overheating suppression temperature $\beta$ is effective to permit the user to be informed of the excessively high temperature and then to reduce the hating power before an automatic fire extinguishment takes place, thereby eliminating the problem associated with an unnecessary extinguishment and a difficulty to use.

With reference to FIG. 7 the hating control means 24 has been described. Summarizing the example of the control temperature for the aluminum pan 4t shown by T4 in FIG. 12, the control temperature Z1 is calculated as the sum of the standard pan temperature control value Z2, the L correction value Z4 and the H correction value Z3, as shown in block 43 of FIG. 7 and is lowered only at the first time as the control temperature value Z1 ($=Z2+Z4+Z3-\eta$) when the vessel temperature sensor 5 gives a value equal to the control temperature, and is thereafter, as the control temperature value Z1 ($=Z2+Z4+Z3-\zeta$), progressively lowered until the value Z3 becomes zero. In this way, the control temperature Z1 is varied to suit to the nature of the pan so that the oil temperature, that is, the temperature of the cooking oil, can attain a value substantially equal to the preset temperature.

While the preset change time temperature correcting means 34 having been described with reference to FIG. 8, the H correction value Z3 is effective to avoid the possibility that the preset temperature and the oil temperature do not coincide with each other due to the relationship with the difference between the new preset temperature and the previous preset temperature and the detected temperature.

As hereinbefore fully described, the cooking apparatus according to the present invention can bring about the following advantages (1) The provision of the material determining means, the quantity determining means and the H and L temperature correction determining means for the temperature control of the cooking oil used to fry food material makes it possible to automatically correct the control temperature relative to the preset temperature according to the type of material and wall thickness of the pan used and also to obtain the temperature of the cooking oil stabilized regardless of the material and the wall thickness of the pan and quantity of the cooking oil.

(2) While it has been difficult to maintain the temperature constant because of a difficulty in controlling the temperature of the cooking oil where the pan has a high thermal conductivity, the provision of means for subtracting the H temperature correction value has made it easy to obtain a proper temperature.

(3) In the case where the pan having a high thermal conductivity, the provision of the quantity determining means makes it possible to coincide the temperature of the cooking oil with the target temperature regardless of the quantity of the cooking oil.

(4) The provision of the L temperature correction determining means makes it possible to accomplish a correction for the wall thickness of the iron pan having a low thermal conductivity and to minimize an error in temperature of the cooking oil relative to the preset temperature.

(5) The provision of the preset change time temperature correcting means makes it possible to accomplish the correction of the correction temperature with due regard paid to the condition of the temperature of the cooking oil and the difference between the new preset temperature and the previous preset temperature and, therefore, the temperature of the cooling oil can be accurately matched with the new preset temperature.

(6) Even though the determination of the correction temperature is not possible because of the high oil temperature, the previous correction temperature is utilized to minimize any error in oil temperature relative to the preset temperature.

(7) It is possible to avoid any possible occurrence of oil fire which would occur when the condition in which the pan used is very small while the minimum heat calorie of the heating unit 10 is very high is allowed to stand for a substantial length of time and, therefore, the cooking apparatus can be used safely.

(8) The use of the overheating suppression temperature $\beta$ is effective to permit the user to be informed of the excessively high temperature and then to reduce the heating power before an automatic fire extinguishment takes place, thereby eliminating the problem associated with an unnecessary extinguishment and a difficulty of use.

Although the present invention has been described in connection with the preferred embodiment thereof with reference to the accompanying drawings, it is to be noted that various changes and modifications are apparent to those skilled in the art. Such changes and modifications are to be understood as included within the scope of the present invention, as defined by the appended claims, unless they depart therefrom.

What is claimed is:

1. A cooking apparatus comprising:
   heating means for heating a cooking vessel containing material to be heated;
   temperature detecting means for detecting a temperature of the cooking vessel as said temperature of the cooking vessel is increased as a result of said heating by said heating means;
   heating control means, operatively coupled to said heating means and to said temperature detecting means, for (a) determining a thermal transfer characteristic of the cooking vessel in accordance with a first gradient of a first temperature increase detected by said temperature detecting means in a first predetermined detected temperature region, (b) determining a quantity of material contained in the cooking vessel in accordance with a second gradient of a second temperature increase detected by said temperature detecting means in a second predetermined detected temperature region which is higher than said first predetermined detected temperature region, said first gradient being different than said second gradient, and (c) controlling said heating means according to both the determined thermal transfer characteristic of the cooking vessel and the determined quantity of material contained in the cooking vessel.

2. The cooking apparatus as claimed in claim 1, wherein said thermal transfer characteristic of the cooking vessel is indicative of at least one of a material of the cooking vessel and a wall thickness of the cooking vessel.

3. The cooking apparatus as claimed in claim 1, wherein said heating control means includes overheating prevention means for effecting at least one of a warning and a reduced heating control when said temperature detected by said temperature detecting means attains a predetermined value which is a predetermined amount less than an ignition temperature of the material contained in the cooking vessel.

4. The cooking apparatus as claimed in claim 1, wherein said heating control means includes a memory means for storing a prestored thermal transfer characteristic value of the cooking vessel, and wherein said heating control means controls said heating means according to both said prestored thermal transfer characteristic value of the cooking vessel and the determined quantity of material contained in the cooking vessel when an initial temperature detected by said temperature detecting means at a start of heating by said heating means exceeds a predetermined temperature.

5. The cooking apparatus as claimed in claim 1, wherein, with respect to the control of said heating means by said heating control means according to both the determined thermal transfer characteristic of the cooking vessel and the determined quantity of material contained in the cooking vessel, the temperature detected by said temperature detecting means for accomplishing the control of the heating means is compared with an initial temperature for control of said heating means for a first time subsequent to a start of said heating and, in the event of a re-heating for compensating for a reduction in temperature of the material contained in the cooking vessel which takes place as a result of a placement of food material to be cooked into the cooking vessel, subsequent temperature for accomplishing the control of said heating means is chosen to be lower than the initial temperature.

6. A method of controlling the heating of cooking oil contained in a cooking vessel, said method comprising:
  activating a heating device to heat the cooking vessel containing the cooking oil to be heated;
  detecting a temperature of the cooking vessel as the temperature of the cooking vessel is increased as a result of said activating of said heating device;
  determining a thermal transfer characteristic of the cooking vessel in accordance with a first gradient of a first temperature increase detected in said temperature detecting step in a first predetermined detected temperature region,
  determining a quantity of cooking oil contained in the cooking vessel in accordance with a second gradient of a second temperature increase detected in said temperature detecting step in a second predetermined detected temperature region which is higher than said first predetermined detected temperature region, said first gradient being different than said second gradient, and
  controlling said heating device according to both the determined thermal transfer characteristic of the cooking vessel and the determined quantity of cooking oil contained in the cooking vessel.

7. The method as claimed in claim 6, wherein the thermal transfer characteristic of the cooking vessel is indicative of at least one of a material of the cooking vessel and a wall thickness of the cooking vessel.

8. The method as claimed in claim 7, further comprising effecting at lest one of a warning and a reduced heating control when the temperature detected in said temperature detecting step attains a predetermined value which is predetermined amount less than an ignition temperature of the cooking oil contained in the cooking vessel.

* * * * *